(12) United States Patent
Shimojima et al.

(10) Patent No.: US 6,250,536 B1
(45) Date of Patent: Jun. 26, 2001

(54) METHOD FOR MANUFACTURING ELECTRODE WIRE FOR ELECTRICAL DISCHARGE MACHINING APPARATUS

(75) Inventors: Kiyoshi Shimojima; Seigi Aoyama; Hideo Kawano; Koichi Tamura; Takahiro Sato; Takamitsu Kimura; Masato Watabe, all of Ibaraki (JP)

(73) Assignee: Hitachi Cable Ltd., Tokyo (JP)

( * ) Notice: Subject to any disclaimer, the term of this patent is extended or adjusted under 35 U.S.C. 154(b) by 0 days.

(21) Appl. No.: 09/311,531

(22) Filed: May 13, 1999

(30) Foreign Application Priority Data

May 15, 1998 (JP) ................................................. 10-150817

(51) Int. Cl.[7] ........................... B21D 21/00; B21D 35/00; B21D 39/00
(52) U.S. Cl. ........................................ 228/141.1; 228/148
(58) Field of Search ................................ 228/141.1, 148, 228/156, 231; 148/682, 683

(56) References Cited

U.S. PATENT DOCUMENTS

| | | | |
|---|---|---|---|
| 3,894,675 | * 7/1975 | Klebl et al. | 228/130 |
| 3,977,913 | * 8/1976 | Cabo et al. | 148/11.5 C |
| 4,055,445 | * 10/1977 | Pops | 148/11.5 C |
| 4,125,924 | * 11/1978 | Goetze et al. | 29/148.4 D |
| 4,156,500 | * 5/1979 | Yoshida et al. | 228/130 |
| 4,673,790 | * 6/1987 | Sawada et al. | 219/69 W |
| 4,806,721 | * 2/1989 | Ito et al. | 219/69 W |
| 4,820,896 | * 4/1989 | Weil et al. | 219/83 |
| 4,968,867 | * 11/1990 | Banzai et al. | 337/290 |
| 5,391,243 | * 2/1995 | Goto et al. | 148/554 |

FOREIGN PATENT DOCUMENTS

| | | |
|---|---|---|
| 406089620A | * 3/1994 | (JP) . |
| 6-47130 | 6/1994 | (JP) . |

* cited by examiner

Primary Examiner—Geoffrey S. Evans
Assistant Examiner—Zidia T. Pittman
(74) Attorney, Agent, or Firm—Scully, Scott, Murphy & Presser

(57) ABSTRACT

The invention relates to a method for manufacturing an electrode wire for an electrical discharge machining apparatus, which is composed of a core wire formed of Cu or Cu-alloy and a covering layer formed of brass. A brass tape is longitudinally applied around a core wire to provide a pipe, a seam formed by butting longitudinal edges of the brass tape is continuously welded to provide a composite wire, area-reduction process of reduction rate less than 65% is applied to the brass pipe by means of a squeezing die, a heat treatment at a temperature higher a recrystallization one of brass is applied to the composite pipe, and thereafter the composite wire is processed to be reduced in area through plural reducing dies step by step.

4 Claims, 3 Drawing Sheets

METHOD FOR MANUFACTURING ELECTRODE WIRE FOR ELECTRICAL DISCHARGE MACHINING APPARATUS

FIELD OF THE INVENTION

The invention relates to a method for manufacturing an electrode wire for an electrical discharge machining apparatus, and especially to a method for manufacturing the same, in which a covering layer formed of brass is made up around a core wire formed of Cu or Cu alloy.

BACKGROUND OF THE INVENTION

Recently, in an electrical discharge machining process using an electrode wire for an electrical discharge machining apparatus, the improvement of electrical discharge machining speed is desired from a viewpoint of uplift of productivity, and the electrode wire for the electrical discharge machining apparatus having a covering layer formed around a core wire is proposed.

As a method for manufacturing the electrode wire for the electrode discharge machining apparatus having the covering layer, the same, in which a pipe shaped brass alloy covering layer is formed around a core wire by means of welding, is proposed (Japanese Patent Kokai, 6-47130).

According to the aforementioned method, a brass tape is longitudinally applied around a core wire to form a pipe, a seam formed by butting longitudinal edges of the brass tape is continuously welded to provided a composite wire, and thereafter the composite wire is processed to be reduced in area by means of plural reducing dies. According to the aforementioned method, since a large scale installation is not necessary, manufacturing cost can be reduced. Moreover, since the electrode wire for the electrical discharge machining apparatus of a long length can be continuously manufactured, this method is profitable in productivity.

However, according to the aforementioned method, a seamlike welded composition is formed along the surface of the composite wire in the longitudinal direction, and in case that the welded composition remains intact, the composite wire is defective in workability at the time of area-reduction process, and there is the possibility of occurrence of the breaking of the composite wire, so that area-reduction process of high reduction rate cannot be applied to the composite wire.

Moreover, the welded composition is not dissolved and extant to the last as a part of the electrode wire for an electrical discharge machining apparatus under some unfavorable condition of area-reduction process, and in such a case, electrical discharge machining process becomes unstable at a part of the welded composition.

Accordingly, it is an object of the invention to solve the aforementioned problems and provide a method for manufacturing an electrode wire for an electrical discharge machining apparatus, by which area-reduction process of high reduction rate can be smoothly carried out and an electrode wire for an electrical discharge machining apparatus with stable discharge machining characteristic can be provided.

According to the feature of the invention, a method for manufacturing an electrode wire for an electrical discharge machining apparatus comprises the steps of:

longitudinally applying a brass tape around a core wire formed of Cu or Cu alloy to provide a pipe, continuously welding a seam formed along the pipe by butting longitudinal edges of the brass tape to provide a composite wire, applying area-reduction process of reduction rate less than 65% to the pipe in the composite wire by means of a squeezing die, applying a heat treatment at a temperature higher than a recrystallization one of brass to the composite wire, and processing the composite wire to be reduced in area by means of plural reducing dies.

Although the maximum reduction rate is 97% in ordinary area-reduction process (drawing process), area-reduction process of reduction rate less than 65% is applied to the brass tape in the composite wire according to the invention as reduction rate necessary for recrystallizing the welded composition in the brass tape in the composite wire. In case that area reduction rate in the ordinary drawing process is applied to the composite wire, the breaking of the composite wire occurs at reduction rate of 65 to 75%, and drawing becomes impossible.

It is well known in the metal engineering that, in order to make the covering layer (the brass tape layer) comprising a welded composition recrystallize by heat treatment, it is necessary to apply moderate plastic working or plastic deformation to the covering layer before heat treatment, and the covering layer is easily recrystallized as the degree of plastic working or plastic deformation is high.

The reason for limiting material of the core wire to Cu or Cu alloy is that the electrical discharge machining characteristic is improved because of high conductivity of the core wire and straightness of the core wire is satisfactory. In case that a steel wire is used as a core wire, the composite wire becomes defective in straightness and is difficult to deal with.

With regard to the diameter of the core wire and the thickness of the brass tape, the diameter of the core wire is selected to be more than 4 mm and the thickness of the brass tape is more than 0.8 mm from a viewpoint of productivity that the diameter of the composite wire is preferably as large as possible.

The reason for that metallic composition of brass is limited to a single phase composition of $\alpha$ phase or a mixing composition of $\alpha$ and $\beta$ phases is that brass containing Zn of high concentration is not suited for area-reduction process (drawing process). On the basis of the aforementioned property of brass, metallic composition of brass is determined so that the drawing process of the composite wire is industrially practicable. Area-reduction process of brass formed of a mixing composition of $\alpha$ and $\beta$ phases becomes difficult as concentration of Zn (rate of $\beta$ phase composition) increases.

BRIEF DESCRIPTION OF THE DRAWINGS

The invention will be explained in more detail in conjunction with appended drawings, wherein.

DESCRIPTION OF THE PREFERRED EMBODIMENTS

Thereafter, an embodiment of the invention will be explained.

Figure 1:
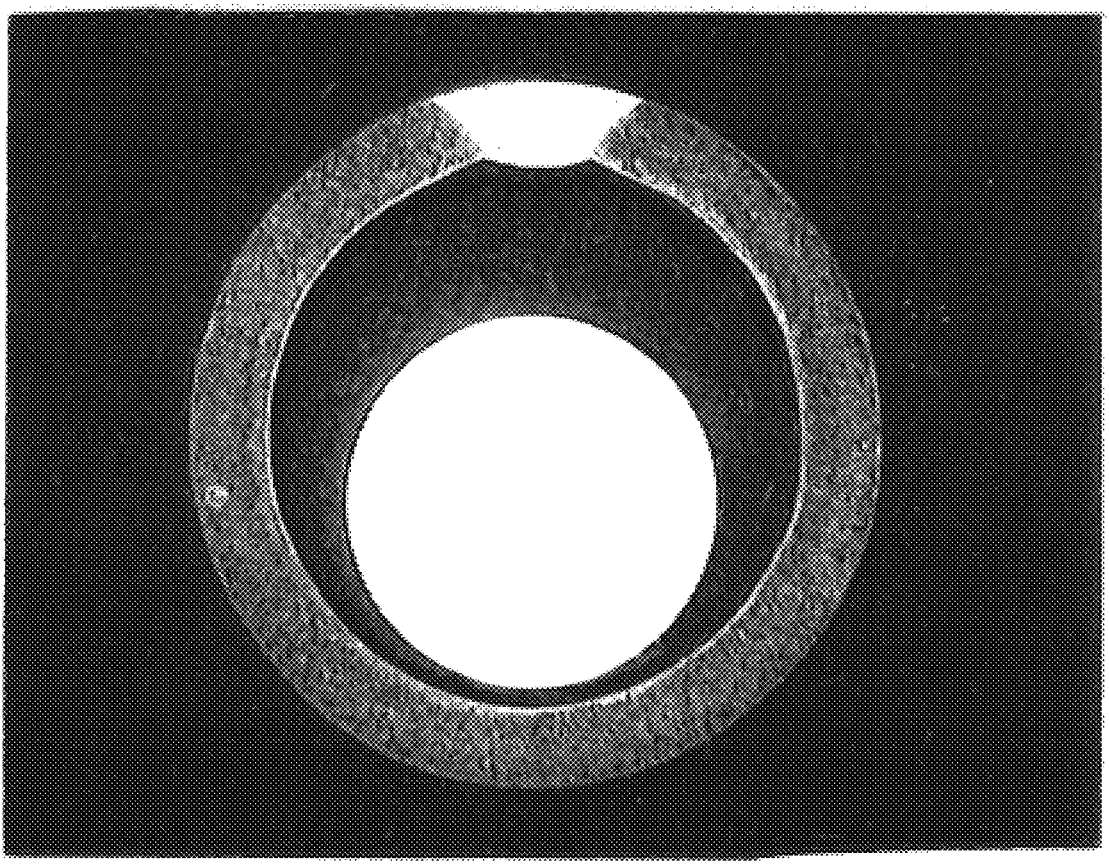
FIG. 1 is a microphotograph for showing a cross-section of a composite wire to be used in manufacturing an electrode wire for an electrical discharge machining apparatus as basic material.

FIG. 1 is a microphotograph for showing a cross-section of a composite wire to be used in manufacturing an electrode wire for an electrical discharge machining apparatus.

As shown in FIG. 1, a composite wire to be used in manufacturing an electrode wire for an electrical discharge machining apparatus is provided by applying a brass tape (a Cu—35 Zn alloy tape, for instance) formed of a single phase composition of α phase or a mixing composition of α and β phases around a core wire (a white circle shown in FIG. 1) formed of Cu or Cu alloy to form a pipe, and welding a seam formed therealong by means of TIG welding. A black part around the core wire in FIG. 1 is a vacant space, and a boundary between a welded composition and basic material can be obviously observed.

Figure 2A:
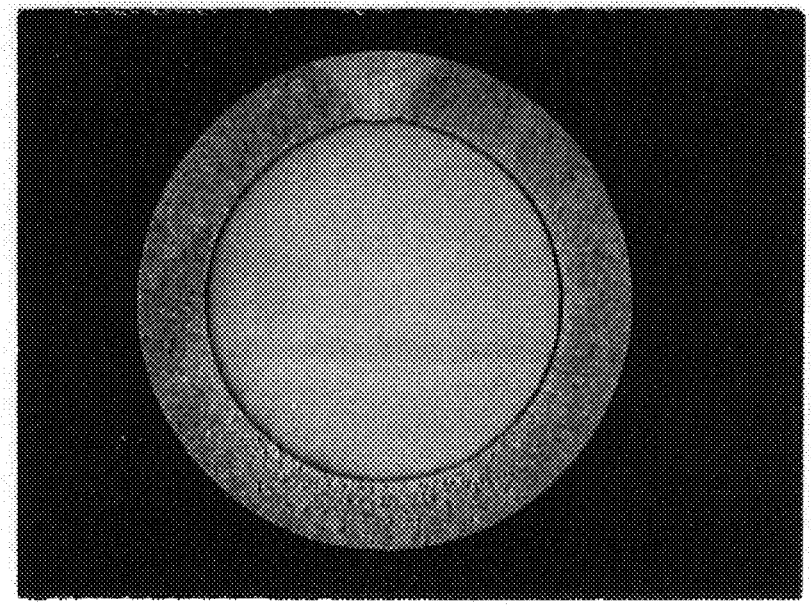
FIG. 2A is a microphotograph of a cross-section of a composite wire after area-reduction process is applied to a brass pipe by means of squeezing die.
Figure 2B:
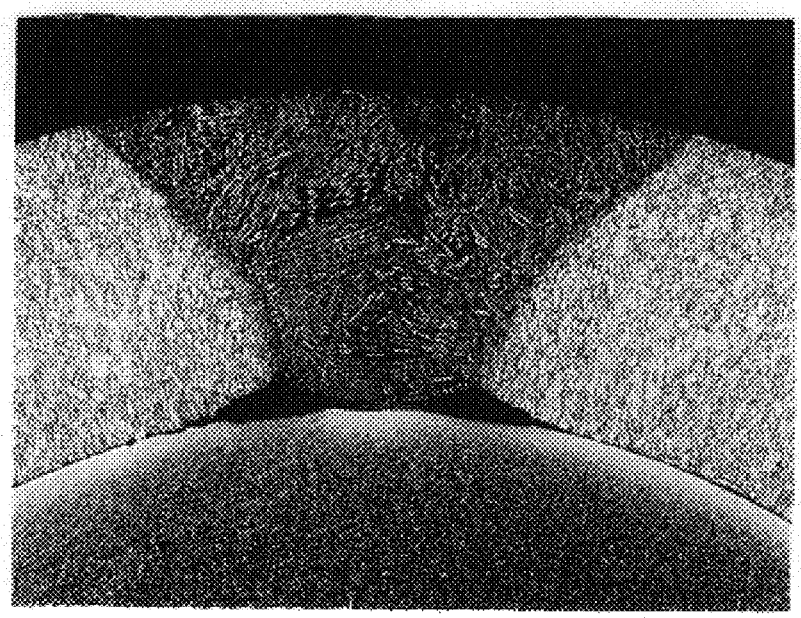
FIG. 2B is an enlarged picture of a part of FIG. 2A.
Figure 3A:
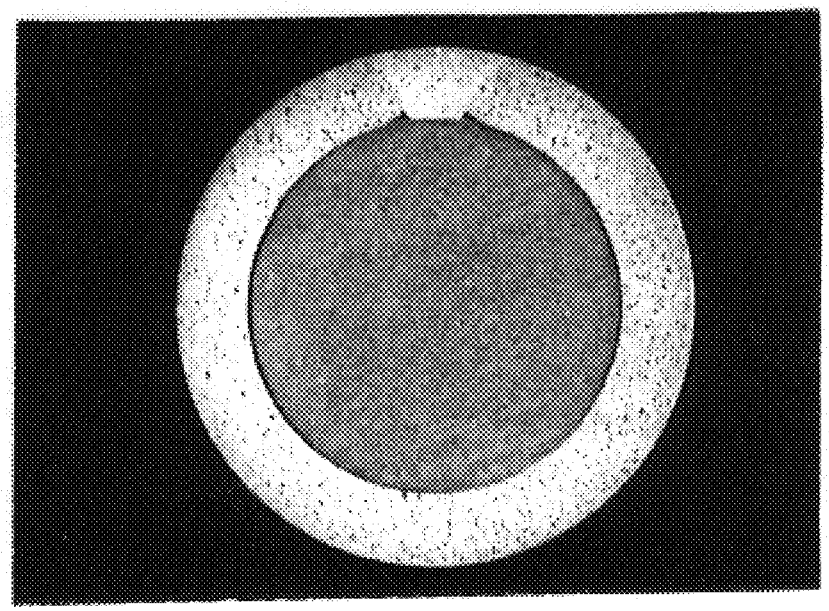
FIG. 3A is a microphotograph for showing a cross-section of a composite wire after heat treatment is applied thereto.

FIG. 2A is a microphotograph of a cross-section of the composite wire after area-reduction process is applied to the brass pipe by means of a squeezing die, and FIG. 2B is an enlarged picture of a part of FIG. 2A. FIG. 3A is a microphotograph for showing a cross-section of a composite wire after heat treatment is applied thereto, and FIG. 3B is an enlarged picture of a part of FIG. 3A.

Thereafter, the composite wire is made to pass through a squeezing die, the brass pipe in the composite wire is processed to be reduced in area at reduction rate of 65%, and a composite wire, in which the core wire sticks fast to the brass layer, is obtained as shown in FIGS. 2A and 2B. In this case, the welded composition in the brass layer is dissolved to some extent as compared with that before area-reduction process, and boundaries between the welded composition and basic material becomes indistinct.

Figure 3B:
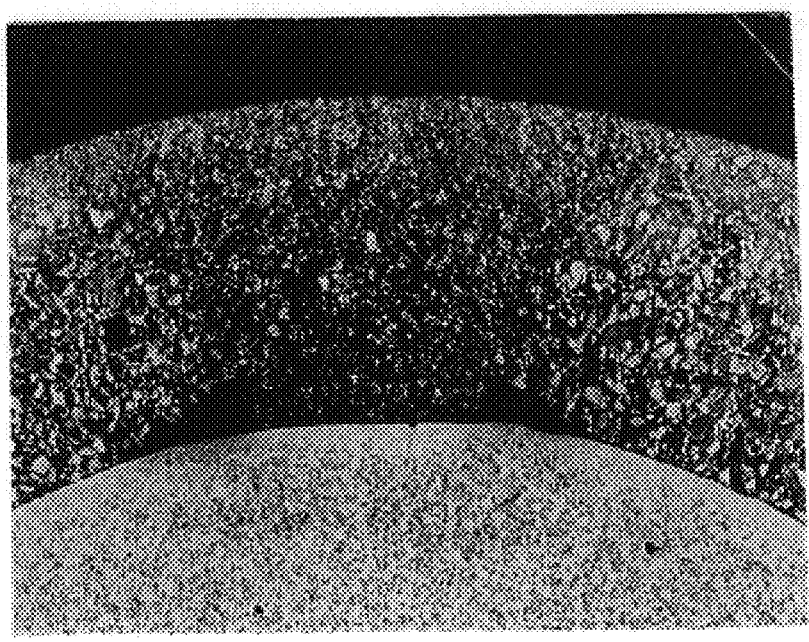
FIG. 3B is an enlarged picture of a part of FIG. 3A.

Thereafter, by applying a heat treatment to the composite wire at a temperature higher than recrystallization one (at 450° C. for 1 hr, for instance), metallic compositions of the welded portion and basic metal are uniformalized as shown in FIGS. 3A and 3B, and a composite wire having a brass covering layer, in which the welded composition is almost dissolved.

Finally, area-reduction process is applied to the composite wire step by step by means of plural reducing dies, and an electrode wire for an electrical discharge machining apparatus can be obtained. Heat treatment for annealing may be inserted between area-reduction processes in accordance with the limit of reduction rate of the composite wire.

Although it is desirable to increase concentration of Zn in the brass layer of the electrode wire for the electrical discharge machining apparatus from a view point of the improvement of electrical discharge machining speed, brass containing Zn of high weight percent is not suited for area-reduction process. Accordingly, concentration of Zn in a brass layer in the composite wire after heat treatment may be increased by covering the composite wire with a Zn layer before or during area-reduction process. There is no limitation on a method for covering the composite wire with the Zn layer.

According to the aforementioned process, the electrode wire for the electrical discharge machining apparatus having a brass layer containing Zn of high weight percent can be easily processed and manufactured as compared with a method for manufacturing the composite wire by using a brass tape containing Zn of high weight percent, and the electrode wire for the electrical discharge machining apparatus with excellent electrical discharge machining characteristic can be industrially and favorably provided.

There is no limitation on the method of the heat treatment of the composite wire at a temperature higher than a recrystallization one of brass, and either of annealing in a batch furnace or continuous annealing may be adopted.

Although there is no limitation on the kind of Cu alloy, it is desirable to adopt Cu alloy, which has high electrical conductivity and tensile strength (especially, tensile strength at a high temperature of actual use) and is acceptable in straightness. For instance, Cu—Sn—In alloy (Cu-0.15 to 0.25 Sn-0.15 to 0.25 In alloy (wt %)) or Cu—Zr alloy (Cu-0.02 to 0.2 Zr alloy (wt %)) can be exemplified.

PREFERRED EMBODIMENTS

Seven pieces of composite wires are made up, each of which is composed of a core wire having a diameter of 4.2 mm and formed of Cu-0.19 Sn-2.0 In alloy and a brass pipe having an external diameter of 8.8 mm and a pipe thickness of 0.84 mm. A brass tape formed of Cu-35 Zn alloy is longitudinally applied around the core wire to provide a pipe, and a seam formed along the brass pipe is welded by means of TIG welding. Unit of chemical composition is given by weight percent.

THE FIRST PREFERRED EMBODIMENT

Using a composite wire mentioned in the above as basic material, area-reduction process is applied to the brass pipe in the composite wire at reduction rate of 30%, and heat treatment is applied to the composite wire at 450° C. for 1hr.

Finally, area-reduction process is applied to the composite wire step by step by means of plural reducing dies, and an electrode wire for an electrical discharge machining apparatus with a diameter of 0.25 mm and a brass layer thickness of 0.036 mm is manufactured. Heat treatment for annealing is applied to the composite wire between area-reduction processes in accordance with the limit of area-reduction rate caused by a reducing die.

THE SECOND PREFERRED EMBODIMENT

The manufacturing process is the same as that of the first preferred embodiment except that the reduction rate caused by the squeezing die is 50%, and an electrode wire for an electrical discharge machining apparatus with a diameter of 0.25 mm and a brass layer thickness of 0.036 mm is manufactured.

THE THIRD PREFERRED EMBODIMENT

The manufacturing process is the same as that of the first preferred embodiment except that the reduction rate caused by the squeezing die is 60%, and an electrode wire for an electrical discharge machining apparatus with a diameter of 0.25 mm and a brass layer thickness of 0.036 mm is manufactured.

THE FOURTH PREFERRED EMBODIMENT

The manufacturing process is the same as that of the first preferred embodiment except that the reduction rate caused by the squeezing die is 65%, and an electrode wire for an electrical discharge machining apparatus with a diameter of 0.25 mm and a brass layer thickness of 0.036 mm is manufactured.

AN EXAMPLE FOR COMPARISON 1

Using the composite wire shown in FIG. 1 as basic material, area-reduction process of low reduction rate is applied to the composite wire step by step by means of reducing plural dies, and an electrode wire for an electrical discharge machining apparatus with a diameter of 0.25 mm and a brass layer thickness of 0.036 mm is manufactured.

AN EXAMPLE FOR COMPARISON 2

Using the composite wire mentioned in the above as basic material, area-reduction process of reduction rate of 70% is applied to the brass layer in the composite wire by means of a squeezing die.

AN EXAMPLE FOR COMPARISON 3

Using the composite wire mentioned in the above as basic material, area-reduction process of area-reduction rate of 80% is applied to the brass layer in the composite wire by means of a squeezing die.

Table 1 shows area-reduction rate (%) caused by a squeezing die, the condition of heat treatment, and estimation of workability in area-reduction process for each of the composite wires, that is to say, the first to fourth preferred embodiments and the examples for comparison 1 to 3.

TABLE 1

| | REDUCTION RATE BY SQUEEZING DIE(%) | CONDITION OF HEAT TREATMENT | WORKABILITY IN AREA-REDUCTION PROCESS |
|---|---|---|---|
| EMBODIMENT 1 | 30 | 450° C. × 1 hr | EXCELLENT (EASILY PROCESSED AT REDUCTION RATE OF 97%) |
| EMBODIMENT 2 | 50 | THE SAME AS THE ABOVE | THE SAME AS THE ABOVE |
| EMBODIMENT 3 | 60 | THE SAME AS THE ABOVE | THE SAME AS THE ABOVE |
| EMBODIMENT 4 | 65 | THE SAME AS THE ABOVE | THE SAME AS THE ABOVE |
| EXAMPLE FOR COMPARISON 1 | NONE | NONE | POOR(CAN BE PROCESSED UP TO REDUCTION RATE OF 65%) |
| EXAMPLE FOR COMPARISON 2 | 70 | — | WIRE IS BROKEN IN AREA-REDUCTION PROCESS BY SQUEEZING DIE |
| EXAMPLE FOR COMPARISON 3 | 80 | — | THE SAME AS THE ABOVE |

As shown in Table 1, since welded composition-dissolving process (area-reduction process of reduction rate less than 65% by means of a squeezing die and subsequent heat treatment at a temperature higher than a recrystallization one of brass) is applied to each of the composite wires according to the first to fourth preferred embodiments of the invention before it is processed to be reduced in area through plural reducing dies, workability in area-reduction process is satisfactory and drawing process can be smoothly carried out at a reduction rate of 97%. That is to say, the number of stages of manufacturing process of the electrodewire for the electrical discharge machining apparatus is reduced to about half of those of the example for comparison 1 and productivity can be improved.

On the other hand, in a composite wire according to the example for comparison 1, since area-reduction process of reduction rate less than 65% is not applied to a brass layer in the composite wire and a heat treatment at a temperature higher than a recrystallization one of brass is not applied to the composite wire, workability in area-reduction process is not satisfactory and the composite wire is processed to be reduced in area at low reduction rate less than 65%. Accordingly, in order to manufacture an electrode wire for an electrical discharge machining apparatus having final dimensions (a wire diameter: 0.25 mm, a thickness of a brass layer: 0.036 mm), multi-stages of area-reduction processes are necessary, and when stages for heat treatment for annealing is included, the total number of the stages of the manufacturing process is further increased.

In a composite wire according to the examples for comparison 2 or 3, since area-reduction process of reduction rate higher than 65% (70 or 80%) is applied to a brass layer in the composite wire, the breaking of the composite wire occurs, and thereafter a manufacturing of an electrode wire for an electrical discharge machining apparatus becomes impossible. It is presumed that, in case that a welded composition exists in the brass layer, workability in area-reduction process of the composited wire is low, and it becomes impossible to apply reduction process to the composite wire at high reduction rate.

An electrode wire for an electrical discharge machining apparatus is manufactured by the same method as those of the first to fourth preferred embodiments except that a Cu-0.16 Zr alloy wire is adopted as a core wire, and the same having satisfactory workability in area-reduction process can be obtained similarly to the cases of the first to fourth preferred embodiments of the invention.

As mentioned in the above, according to the invention, a brass tape is longitudinally applied around a core wire formed of Cu or Cu alloy to form a composite wire, a seam formed by butting both edges of the brass tape against each other is continuously welded, area-reduction process of reduction rate less than 65% is applied to the brass pipe by means of a squeezing die, and heat treatment at a temperature higher than a recrystallization one of brass is applied to the composite wire. Accordingly, a welded composition is the brass layer is almost dissolved, and thereafter the composite wire is processed to be reduced in area through plural reducing dies step by step. In the aforementioned process, workability in the area-reduction process is satisfactory, and composition of brass layer is uniformalized, so that the electrode wire for the electrical discharge machining apparatus with stable electrical discharge machining characteristic can be manufactured with high productivity.

What is claimed is:

1. A method for fabricating an electrode wire for an electrical discharge machining apparatus, comprising the steps of:

longitudinally applying a brass tape around a core wire formed of Cu or Cu alloy to form a pipe, continuously welding a seam formed along said pipe by butting longitudinal edges of said brass tape to provide a composite wire, applying area-reduction process of reduction rate less than 65% to said pipe in said composite wire by means of a squeezing die, applying a heat treatment at a temperature higher than a recrystallization one of brass to said composite wire, and processing said composite wire to be reduced in area by means of plural reducing dies.

2. A method for manufacturing an electrode wire for an electrical discharge machining apparatus according to claim 1, wherein:

said brass tape with a thickness of more than 0.8 mm is longitudinally applied to said core wire with a diameter of more than 4 mm to form said pipe.

3. A method for manufacturing an electrode wire for an electrical discharge machining apparatus according to claim 1, wherein:

said brass tape is formed of a single phase composition of $\alpha$ phase or a mixing phase composition of $\alpha$ and $\beta$ phases.

4. A method for manufacturing an electrode wire for an electrical discharge machining apparatus according to claim 1, further comprising a step of forming a zn layer around said composite wire before or during said area-reduction process of said composite wire.

* * * * *